(12) United States Patent
Mikesell et al.

(10) Patent No.: US 6,990,194 B2
(45) Date of Patent: Jan. 24, 2006

(54) DYNAMIC BALANCE CONTROL FOR TELEPHONE

(75) Inventors: James R. Mikesell, Tempe, AZ (US); Franklyn H. Story, Chandler, AZ (US)

(73) Assignee: Acoustic Technology, Inc., Mesa, AZ (US)

( * ) Notice: Subject to any disclaimer, the term of this patent is extended or adjusted under 35 U.S.C. 154(b) by 201 days.

(21) Appl. No.: 10/441,724

(22) Filed: May 19, 2003

(65) Prior Publication Data

US 2004/0234069 A1 Nov. 25, 2004

(51) Int. Cl.
*H04M 1/00* (2006.01)
(52) U.S. Cl. ............................ 379/406.04; 379/406.08; 381/71.1
(58) Field of Classification Search .......... 379/406.01, 379/406.04, 406.08; 381/71.1
See application file for complete search history.

(56) References Cited

U.S. PATENT DOCUMENTS 6,442,275 B1 * 8/2002 Diethorn ................ 379/406.14

* cited by examiner

*Primary Examiner*—Jefferey F. Harold
(74) *Attorney, Agent, or Firm*—Paul F. Wille (57) ABSTRACT

A telephone includes a transmit channel and a receive channel, each including a bank of sub-band filters having a VAD coupled one to each sub-band filter. Each VAD measures the spectral energy in a sub-band, compares the spectral energy to a first threshold, and produces an output signal representative of whether or not the first threshold is exceeded. The voice activity detector also includes a threshold circuit for calculating a dynamically adjustable noise threshold based upon averaged measured spectral energy. A wide band or system VAD monitors echo canceling circuitry to detect voice activity and double talk. A dynamic balance control circuit maintains the transmit and receive channels in a predetermined energy ratio during double talk.

13 Claims, 10 Drawing Sheets

```
/* Calculate new threshold */
/* This threshold is implemented by a first order IIR averaging filter */
/* y[n] = (gamma)x[n] + (1-gamma)y[n-1] */
if (energyQ1d31 <= thresholdQ1d31)
{
    /* The following code implements the difference equation:
     * y[n] = (gamma)x[n] + (1-gamma)y[n-1] as the following equation:
     * y[n] = (x[n]>>k) + y[n-1] - (y[n-1]>>k) where gamma = 1/(2^k).
     * This restricts gamma to some discrete values, but reduces
     * computation significantly. */
    averageQ1d31 = prevState->prevAvgQ1d31;
    temp32 = frdidShr(averageQ1d31, gamma);
    averageQ1d31 = frdddSub(averageQ1d31, temp32);
    temp32 = frdidShr(energyQ1d31, gamma);
    averageQ1d31 = frdddAdd(averageQ1d31, temp32);
```

DYNAMIC BALANCE CONTROL FOR TELEPHONE

CROSS-REFERENCE TO RELATED APPLICATION

This application relates to copending application Ser. No. 09/326,864, filed Jun. 7, 1999, entitled Noise Reduction Circuit for Telephones, assigned to the assignee of this invention, and herein incorporated by reference in its entirety. This application also relates to copending application Ser. No. 10/057,160 filed Jan. 25, 2002, entitled Telephone Having Four VAD Circuits, assigned to the assignee of this invention, and herein incorporated by reference in its entirety.

BACKGROUND OF THE INVENTION

This invention relates to a telephone employing sub-band analysis and synthesis for echo cancellation and noise reduction and, in particular, to a control circuit that utilizes a plurality of voice activity detector (VAD) circuits in the sub-bands for controlling the operation of the telephone.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers, and audio processing circuits that perform complex wave analysis, such as geophones and electronic stethoscopes.

The detector described herein is referred to as a voice activity detector but is not limited to just that function. As will be apparent from a complete understanding of the invention, the detector can be adjusted to sense intelligence or patterns of various kinds, e.g. fax signals, not just voice signals. Calling the detector a "message" activity detector or a "communication" activity detector is not more clear than the more familiar term of voice activity detector and, therefore, these other terms are not used.

Virtually since the invention of the telephone, techniques have been developed to improve the clarity of the sound reproduced at each station. There are a number of techniques but two are of particular interest. A first technique uses what is known as a sub-band analysis and synthesis, of which complementary comb filters i.e. a plurality of filters wherein band pass filters alternate with band stop filters, are an example. Comb filters with complementary pass bands and stop bands are coupled in the two audio channels connecting the two stations of a telephone call. That is, the pass bands in one channel are the stop bands in the other channel. As a result, a signal traveling in one direction will be slightly attenuated but a signal traveling in a loop, i.e. an echo, will encounter both sets of stop bands and be highly attenuated.

The use of the complementary comb filters reduces the acoustic coupling between the speaker and microphone at each station as well as inter-station or line echo. Echo canceling circuits, which try to recognize a delayed signal as an echo, are much more complicated than complementary comb filter circuits and the two are often used together to eliminate echoes and other noises. However, comb filters degrade the quality of speech and do not always provide a sufficient margin of acoustic stability. One reason for the degradation is that the frequency response of a room in which the microphone and speaker of a station are located is characterized by a large number of resonant peaks. The band transitions in the comb filter transfer functions are often not sharp enough to suppress the resonant peaks, because if the transitions are too sharp the quality of the transmitted audio signal is adversely affected.

Figure 6:
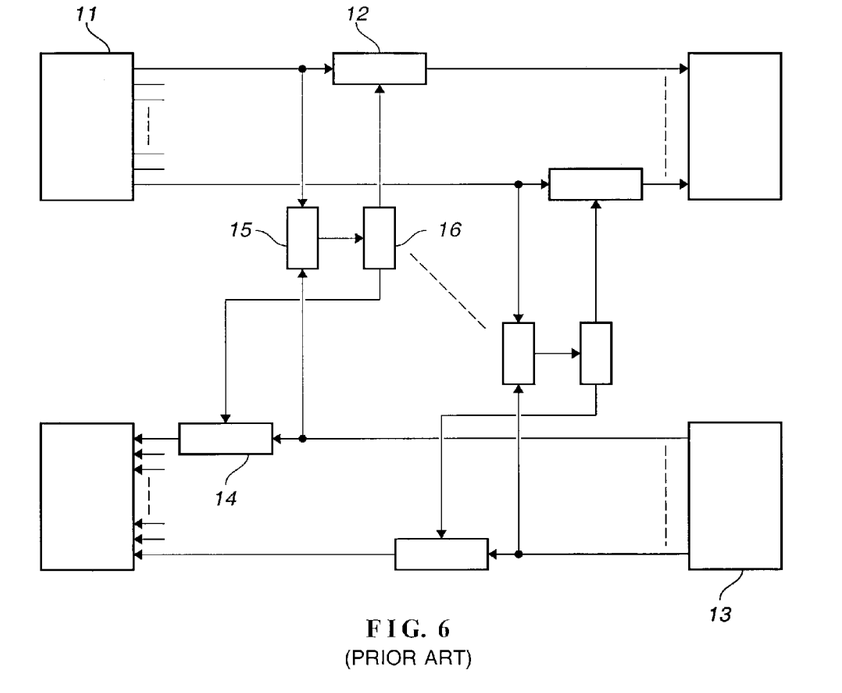
FIG. 6 is a block diagram of a sub-band filter system as described in U.S. Pat. No. 4,991,167.

Complementary comb filter circuits are disclosed in U.S. Pat. No. 5,386,465 (Addeo et al.). This patent includes complementary comb filters in combination with other apparatus for processing audio signals to reduce noise. U.S. Pat. No. 4,991,167 (Petri et al.) discloses a slightly different system, illustrated in FIG. 6. Signals in the transmit direction are separated by filter block 11 into a set of bands, each including an attenuator, such as attenuator 12. Similarly, signals in the receive direction are separated by filter block 13 into the same set of bands, each including an attenuator, such as attenuator 14. The signals in the corresponding transmit band and receive band are compared, such as in comparator 15. The band with the smaller signal is attenuated by control circuit 16. Thus, the transmit and receive bands are paired and there is no logic interconnecting the control circuits for each pair.

Figure 7:
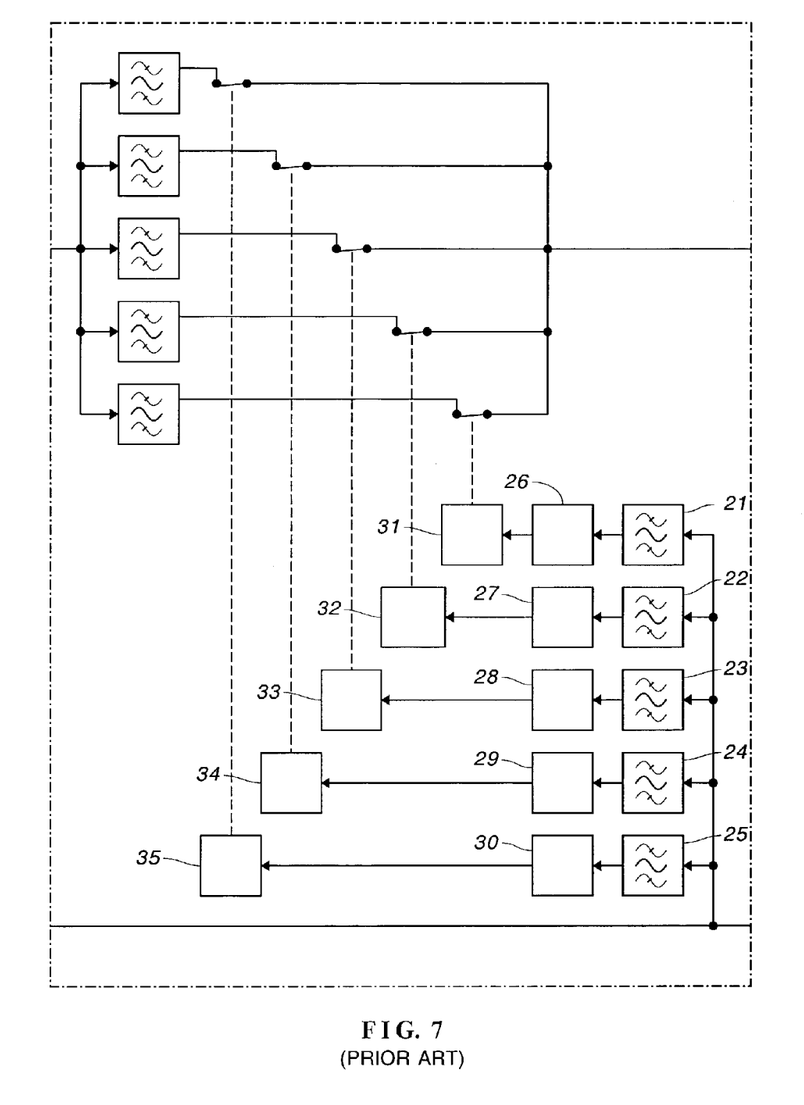
FIG. 7 is a block diagram of a sub-band filter system as described in U.S. Pat. No. 3,567,873.

Another variation on the comb filter is disclosed in U.S. Pat. No. 3,567,873 (Peroni), illustrated in FIG. 7. In this patent, the receive signal is passed through a filter bank, represented by filters 21, 22, 23, 24, and 25. The signals in each sub-band is compared with a threshold in level detectors 26, 27, 28, 29, and 30 respectively. Relays 31, 32, 33, 34, and 35 close their respective contacts for each band of the received signal that exceeds its threshold. In an alternative embodiment, a second set of contacts is included in the receive channel and operated oppositely from the first set from the first set. As with the Petri patent, there is no control logic looking at all the sub-bands in both channels.

A problem with these approaches is that, unlike complementary comb filters, one can attenuate the signals in adjacent bands, thereby noticeably degrading the quality of the voice transmission. If the signal in one channel is particularly loud, the telephone is reduced to "half duplex" or simplex operation, i.e. single direction at a time because sounds from the other station are inaudible. The person speaking must stop and the circuits must re-settle before a person at the other-station can be heard.

Copending patent application Ser. No. 09/326,864, filed Jun. 7, 1999, discloses the system illustrated, in FIG. 8. Transmitting channel 41 and receiving channel 42 operate independently except for control 40, which controls each variable gain amplifier, to which it is connected by a dashed line. When the circuit is first turned on, each variable gain amplifier is set to unity gain. At unity gain, a signal on input 43 is divided into a plurality of bands by the band pass filters and then recombined, unaffected, in summing circuit 44. Similarly, a signal on input 46 is divided into a plurality of bands by the band pass filters and then recombined, unaffected, in summing circuit 47.

Figure 8:
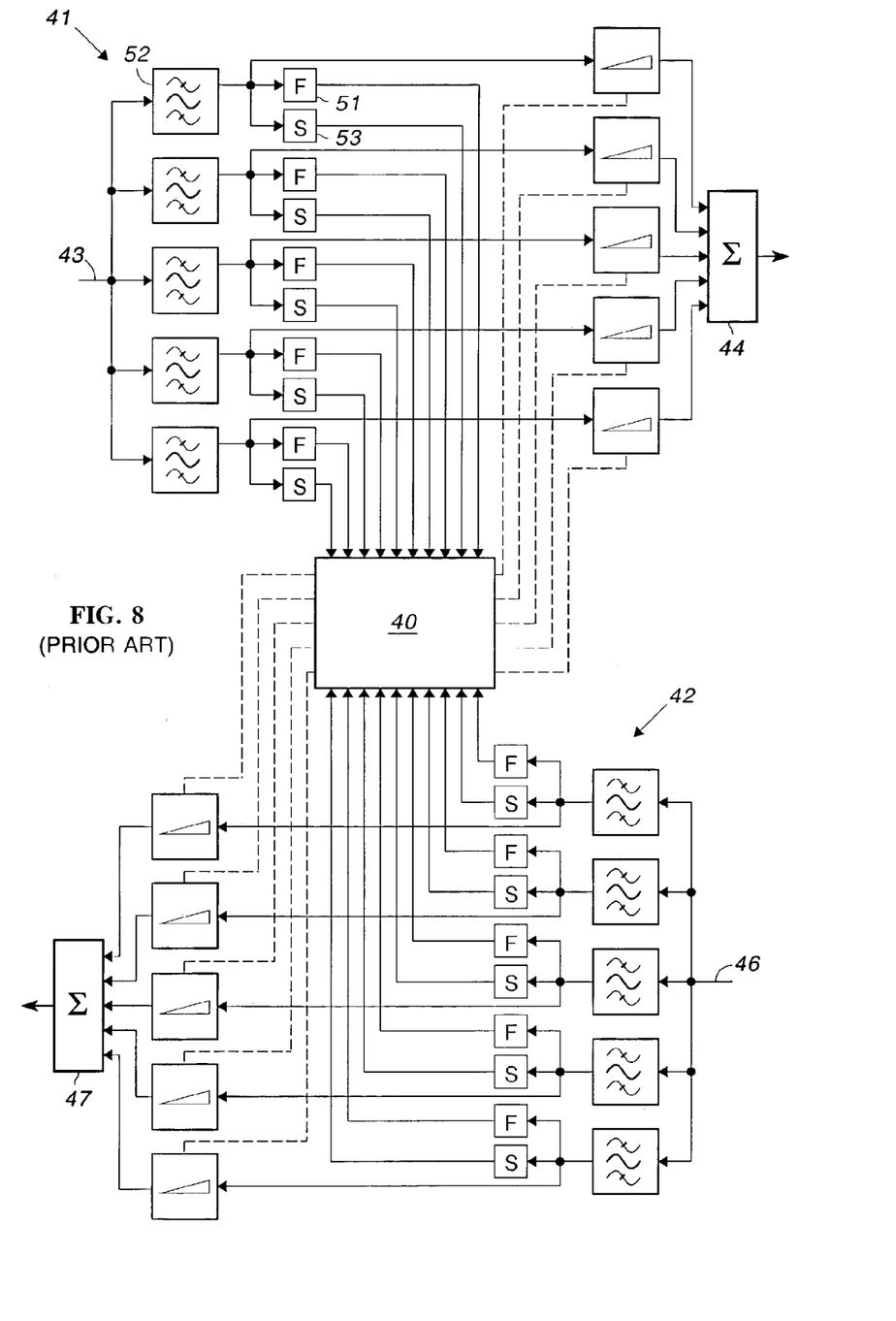
FIG. 8 is a block diagram of a sub-band filter system disclosed in said copending application Ser. No. 09/326,864.

The output of each band pass filter is also coupled to a detector, such as detector 51 at the output of filter 52. Detector 51 senses when the power of the signal from filter 52 briefly exceeds a threshold and provides a suitable signal to control logic 40. Detectors, such as detector 53, sense when the power of the signal exceeds a threshold for a longer period and provide a suitable signal to control logic 40. Control logic 40 analyzes the information from all inputs and controls the attenuators accordingly. In particular, echoes are reduced by controlling the attenuators in one channel in accordance with the amplitude of the signal in a corresponding band in the other channel. Background noise is reduced by attenuating the signals in a channel in accordance with the amplitude of the signals in each band of that channel. Adjacent bands in a channel may not be attenuated fully, i.e. set to minimum gain/maximum attenuation. Secondly, maximum attenuation does not take place in the same band in both channels. In general, control logic 40 operates to minimize background noise and echo. It is desired to improve the control of the signal level in each channel to prevent, to the extent possible, half duplex operation.

Anyone who has used a typical speaker telephone is well aware of the cut off speech and the silent periods during a conversation caused by echo canceling circuitry. Such telephones operate in what is known as half-duplex mode, which means that only one person can speak at a time. While such silent periods assure that the sound from the speaker is not coupled directly into the microphone within a speaker telephone, the quality of the call is poor.

Whether or not to receive (listen) or transmit (talk) is not easily resolved in the particular application of telephone communication. Voices may overlap, so-called "double talk" particularly if there are more than two parties to a call. Background noise may cause problems if the noise level is a significant percentage of the voice level. Pauses in a conversation do not necessarily mean that a person is finished speaking and that it is time for someone else to speak. A voice signal is a complex wave that is discontinuous because not all speech sounds use the vocal chords. Analyzing a voice signal in real time and deciding whether or not a person has finished speaking is a complex problem despite the ordinary human experience of doing it unconsciously or subconsciously. A variety of electronic systems have been proposed in the prior art for arbitrating send or receive but the problem remains.

U.S. Pat. No. 4,796,287 (Reesor et al.) discloses a speaker telephone in which a decremented counter provides a delay to channel switching by the remainder of the circuit. The magnitudes of the line signal and the microphone signal are used in determining whether or not to switch channels.

U.S. Pat. No. 4,879,745 (Arbel) discloses a half-duplex speaker telephone that controls the selection of either a transmit or a receive audio path based upon a present state of the speaker telephone and the magnitudes of three variables associated with each path. The three variables for each path include signal power, noise power, and worst-case echo.

U.S. Pat. No. 5,418,848 (Armbrüster) discloses a double talk detector wherein an evaluation circuit monitors voice signals upstream and downstream of echo canceling apparatus for detecting double talk. An up—down counter is incremented and decremented at different rates and a predetermined count is required before further signal processing takes place.

U.S. Pat. No. 5,598,466 (Graumann) discloses a voice activity detector including an algorithm for distinguishing voice from background noise based upon an analysis of average peak value of a voice signal compared to the current number of the audio signal.

U.S. Pat. No. 5,692,042 (Sacca) discloses a speaker telephone including non-linear amplifiers to compress transmitted and received signals, and level detectors to determine the levels of the compressed transmitted and received signals. The compressed signals are compared in a comparator having hysteresis to enable either transmit mode or receive mode.

U.S. Pat. No. 5,764,753 (McCaslin et al.) discloses a double talk detector that compares the send and receive signals to determine "Return Echo Loss Enhancement," which is stored as a digital value in a register. The digital value is adjusted over time and is used to provide a variable, rather than fixed, parameter to which new data is compared in determining whether to send or receive.

U.S. Pat. No. 5,867,574 (Eryilmaz) discloses a voice activity detection system that uses a voice energy term defined as the sum of the differences between consecutive values of a speech signal. Comparison of the voice energy term with threshold values and comparing the voice energy terms of the transmit and receive channels determines which channel will be active.

U.S. Pat. No. 6,138,040 (Nicholls et al.) discloses comparing the energy in each "frame" (thirty millisecond interval) of speech with background energy to determine whether or not speech is present in a channel. A timer is disclosed for bridging gaps between voiced portions of speech.

Typically, these systems are implemented in digital form and manipulate large amounts of data in analyzing the input signals. The Sacca patent discloses an analog system using an amplifier with hysteresis to avoid dithering, which, to a large extent, is unavoidable with a simple amplitude comparison. On the other hand, an extensive computational analysis to determine relative power takes too long. The Eryilmaz patent attempts to simplify the amount of computation but still requires manipulation of significant amounts of data. All these systems manipulate amplitude data, or data derived from amplitude, up to the point of making a binary value signal indicating voice.

One can increase the speed of a system by reducing the amount of data being processed. Unfortunately, this typically reduces the resolution of the system. For example, all other parameters being equal, eight bit data is more quickly processed than sixteen bit data. The problem is that resolution is reduced. In an acoustic environment, the quality or fidelity of the audio signal requires a minimum amount of data. Thus, the problem remains of speeding up a system other than by simply increasing the clock frequency.

Some of the prior art systems use historical data, e.g. three occurrences of what is interpreted as a voice signal. Such systems require large amounts of memory to handle the historical voice data and the current voice data.

Voice detection is not just used to determine transmit or receive. A reliable voice detection circuit is necessary in order to properly control echo canceling circuitry, which, if activated at the wrong time, can severely distort a desired voice signal. In the prior art, this problem has not been solved satisfactorily.

In view of the foregoing, it is therefore an object of the invention to provide an improved method and apparatus for controlling echo cancellation and noise reduction in a telephone.

Another object of the invention is to provide a method and apparatus for controlling a telephone to minimize half duplex operation during a call.

A further object of the invention is to provide a circuit having dynamically adjustable thresholds for analyzing energy content of a speech signal.

Another object of the invention is to provide a voice activity detector that does not require large amounts of data for reliable detection of a voice signal.

SUMMARY OF THE INVENTION

The foregoing objects are achieved in this invention in which a telephone includes a transmit channel and a receive channel, each including a bank of sub-band filters having a VAD coupled one to each sub-band filter. Each VAD measures the spectral energy in a sub-band, compares the spectral energy to a first threshold, and produces an output signal representative of whether or not the first threshold is exceeded. The voice activity detector also includes a threshold circuit for calculating a dynamically adjustable noise threshold based upon the measured spectral energy. A wide band or system VAD monitors echo canceling circuitry to detect voice activity and double talk. A dynamic balance control circuit maintains the transmit and receive channels in a predetermined energy ratio during double talk.

BRIEF DESCRIPTION OF THE DRAWINGS

A more complete understanding of the invention can be obtained by considering the following detailed description in conjunction with the accompanying drawings, in which.

Those of skill in the art recognize that, once an analog signal is converted to digital form, all subsequent operations can take place in one or more suitably programmed microprocessors. Reference to "signal", for example, does not necessarily mean a hardware implementation or an analog signal. Data in memory, even a single bit, can be a signal. In other words, a block diagram herein can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

Figure 1:
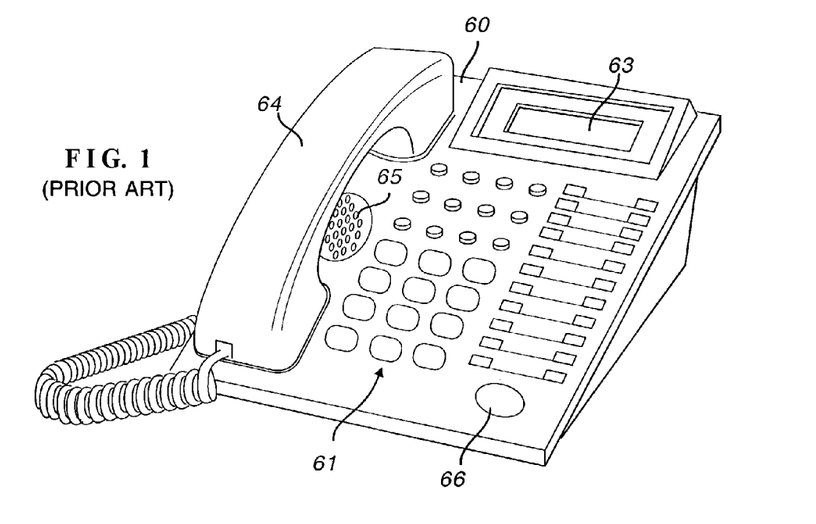
FIG. 1 is a perspective view of a desk telephone.
Figure 2:
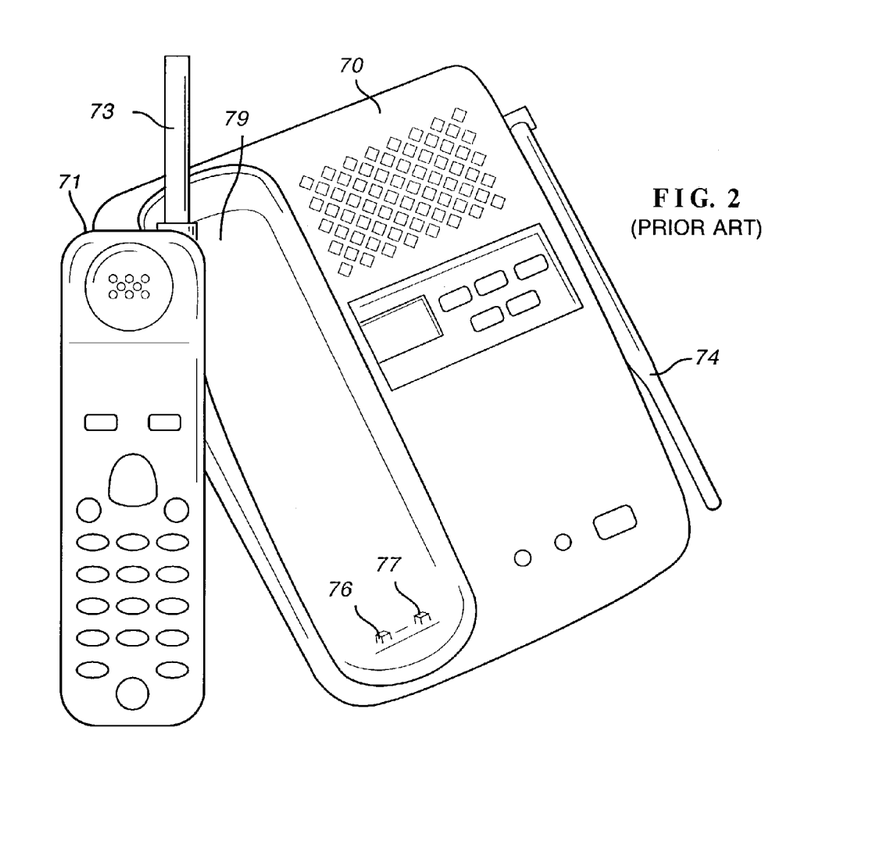
FIG. 2 is a perspective view of a cordless telephone.

This invention finds use in many applications where the electronics is essentially the same but the external appearance of the device may vary. FIG. 1 illustrates a desk telephone including base 60, keypad 61, display 63 and handset 64. As illustrated in FIG. 1, the telephone has speaker phone capability including speaker 65 and microphone 66. The cordless telephone illustrated in FIG. 2 is similar except that base 70 and handset 71 are coupled by radio frequency signals, instead of a cord, through antennas 73 and 74. Power for handset 71 is supplied by internal batteries (not shown) charged through terminals 76 and 77 in base 70 when the handset rests in cradle 79.

Figures 3, 4:
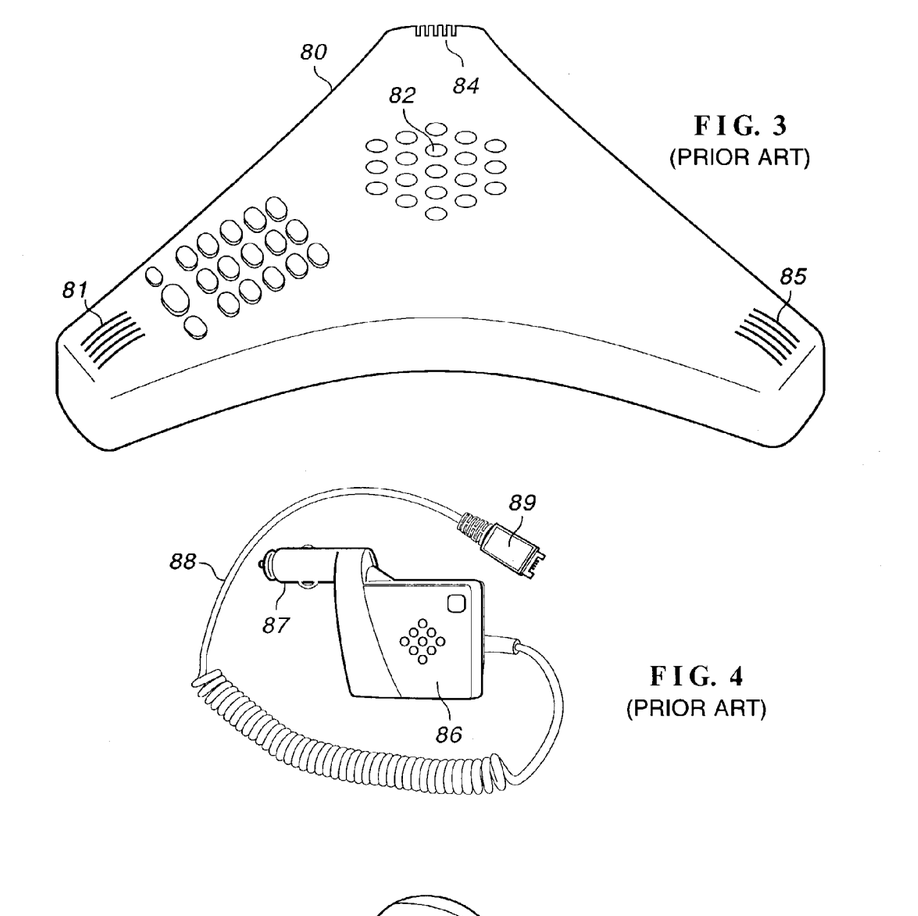
FIG. 3 is a perspective view of a conference phone or a speaker phone.
FIG. 4 is a perspective view of a hands free kit.

FIG. 3 illustrates a conference phone or speaker phone such as found in business offices. Telephone 80 includes microphone 81 and speaker 82 in a sculptured case. Telephone 80 may include several microphones, such as microphones 84 and 85 to improve voice reception or to provide several inputs for echo rejection or noise rejection, as disclosed in U.S. Pat. No. 5,138,651 (Sudo).

Figure 5:
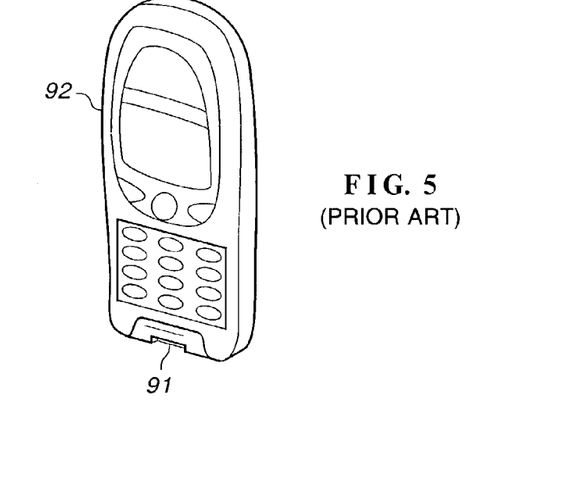
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 86 attached to plug 87, which fits an accessory outlet or a cigarette lighter socket in a vehicle. A hands free kit also includes cable 88 terminating in plug 89. Plug 89 fits the headset socket on a cellular telephone, such as socket 91 (FIG. 5) in cellular telephone 92. Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Audio processing circuitry constructed in accordance with the invention can be included in a hands free kit or in a cellular telephone.

Figure 9:
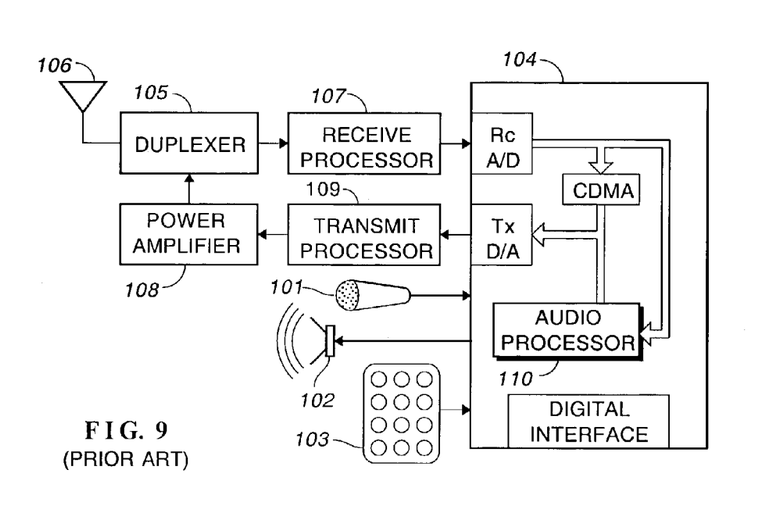
FIG. 9 is a generic block diagram of audio processing circuitry in a telephone.

The various forms of telephone can all benefit from the invention. FIG. 9 is a block diagram of the major components of a cellular telephone. Typically, the blocks correspond to integrated circuits implementing the indicated function. Microphone 101, speaker 102, and keypad 103 are coupled to signal processing circuit 104. Circuit 104 performs a plurality of functions and is known by several names in the art, differing by manufacturer. For example, Infineon calls circuit 104 a "single chip baseband IC." QualComm calls circuit 104 a "mobile station modem." The circuits from different manufacturers obviously differ in detail but, in general, the indicated functions are included.

A cellular telephone includes both audio frequency and radio frequency circuits. Duplexer 105 couples antenna 106 to receive processor 107. Duplexer 105 couples antenna 106 to power amplifier 108 and isolates receive processor 107 from the power amplifier during transmission. Transmit processor 109 modulates a radio frequency signal with an audio signal from circuit 104. In non-cellular applications, such as speakerphones, there are no radio frequency circuits and signal processor 104 maybe simplified somewhat. Problems of echo cancellation and noise remain and are handled in audio processor 110. It is audio processor 110 that is modified to include the invention. How that modification takes place is more easily understood by considering the echo canceling and noise reduction portions of an audio processor in more detail.

Figure 10:
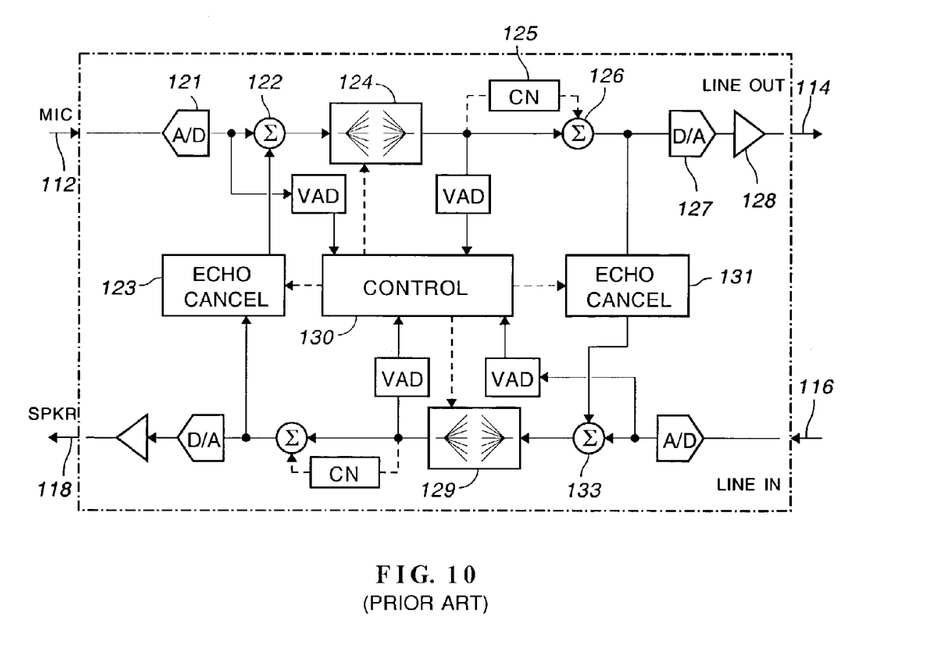
FIG. 10 is a more detailed block diagram of audio processing circuitry in a telephone.

FIG. 10 is a detailed block diagram of a noise reduction and echo canceling circuit; e.g. see chapter 6 of *Digital*

*Signal Processing in Telecommunications* by Shenoi, Prentice-Hall, 1995, with the addition of four VAD circuits as disclosed in said copending application Ser. No. 10/057,160 and the addition of sub-band filter banks. The following describes signal flow through the transmit channel, from microphone input 112 to line output 114. The receive channel, from line input 116 to speaker output 118, works in the same way.

A new voice signal entering microphone input 112 may or may not be accompanied by a signal from speaker output 118. The signals from input 112 are digitized in A/D converter 121 and coupled to summation network 122. There is, as yet, no signal from echo canceling circuit 123 and the data proceeds to sub-band filters 124, which is initially set to minimum attenuation.

The output from sub-band filters 124 is coupled to summation circuit 126, where comfort noise 125 is optionally added to the signal converted back to analog form by D/A converter 127, amplified in amplifier 128, and coupled to line output 114. The filter banks in each channel shown in FIG. 8 are located in filter banks 124 and 129. Data from the four VAD circuits is supplied to control 130, which uses the data for allocating sub-bands, echo elimination, and other functions. Control circuit 40 (FIG. 8) can be part of control 130 or separate; e.g. as when located in a hands free kit. Circuit 123 reduces acoustic echo and circuit 131 reduces line echo. The operation of these last two circuits is known per se in the art; e.g. as described in the above-identified text.

Figure 11:
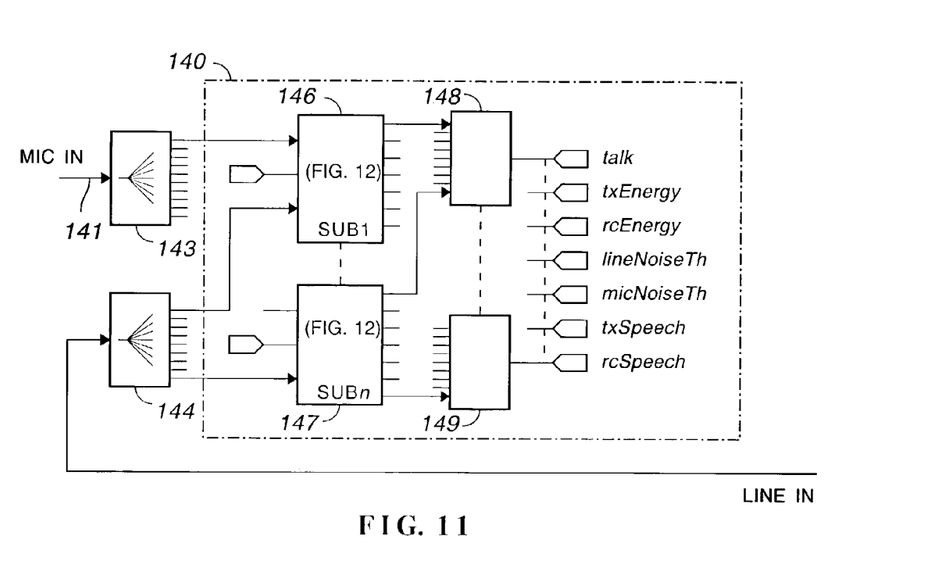
FIG. 11 is a block diagram of a distributed VAD control system constructed in accordance with the invention.

FIG. 11 is a block diagram of an audio processing circuit including a distributed VAD control system in accordance with the invention. Circuit 140 includes microphone input 141 and line input 142. Sub-band filter bank 143 is coupled to microphone input 141 and sub-band filter bank 144 is coupled to line input 142. The output from each filter in bank 143 is coupled to a sub-band detector circuit, such as circuit 146 or circuit 147. A sub-band detector circuit is illustrated in greater detail in FIG. 12.

One band from the transmit channel, i.e. the channel coupled to microphone input 141, and the corresponding band from the receive channel, i.e. the channel coupled to line input 142, are coupled to detector 146. As indicated by the dashed line between detector 146 and detector 147, there is a separate detector for each sub-band and each detector receives a filtered signal from microphone input 141 and a filtered signal from line input 142. By way of example and not limitation, one embodiment of the invention included ten sub-bands in each channel. Therefore, there were ten sub-band detectors.

Each sub-band detector has a plurality of outputs and like outputs are consolidated into data words or vectors. For example, one output is designated rcSpeech (the names are arbitrary and are usually a mnemonic name indicating function). One output from sub-band detector 146 and the corresponding output from sub-band detector 147 are coupled to combining circuit 148. As indicated by the dashed line between combining circuit 148 and combining circuit 149, there is a combining circuit for each output of the sub-band detectors. The functions of the combining circuits may vary slightly, depending upon the nature of the input signal. For example, the rcSpeech signal is a one bit value from each sub-band detector. Combining circuit 148 collects the bits and converts the data into a word. Another output from the sub-band detector is txEnergy, which is a sixteen bit value representing the energy measurement in the current frame of data from the transmit channel. The ten sixteen bit values are stored as vectors by a combining circuit for further use.

Figure 12:
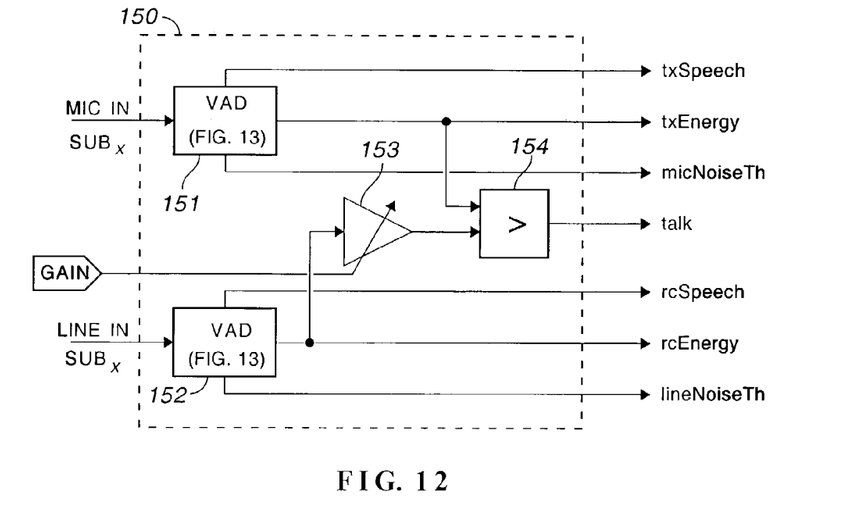
FIG. 12 is a more detailed block diagram of a block shown in FIG. 11.

The signals being combined may better be understood by considering the sub-band detector in greater detail in FIG. 12. Sub-band detector 150 includes VAD circuit 151 and VAD circuit 152. The input to VAD circuit 151 is coupled to the output of a sub-band filter in the transmit channel. The input to VAD circuit 152 is coupled to the output of the corresponding sub-band filter in the receive channel. By "corresponding" is meant that the sub-band filter in the receive channel has approximately the same center frequency and band width as a sub-band filter in the transmit channel or vice-versa.

Each VAD detects speech, measures speech energy, and measures background noise energy. One could measure peak amplitude instead of measuring energy but measuring energy is preferred. Signals representing transmit speech energy and receive speech energy are compared in comparator 154 to produce a talk signal, a one-bit binary representation of which is greater. In one embodiment of the invention, a logic "1" represents greater transmit energy. Obviously, any consistent logic representation could be used.

Figure 13:
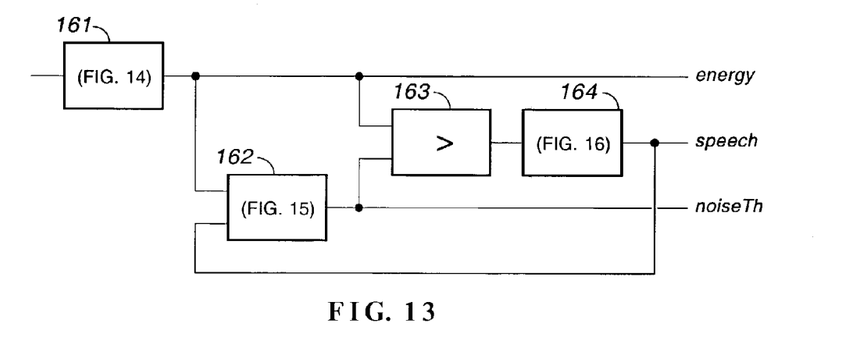
FIG. 13 is a block diagram of a VAD circuit constructed in accordance with the invention.

The inner workings of each VAD circuit is illustrated in FIG. 13. The energy calculation is made in block 161, shown in detail in FIG. 14. A "frame", in one embodiment of the invention, is thirty-two samples, which corresponds to a period of 4 milliseconds at a sample rate of 8,000 samples per second. Other frame sizes and sample rates could be used instead.

Figure 14:
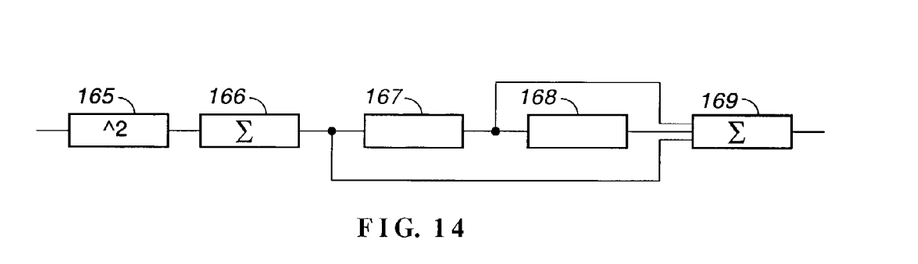
FIG. 14 is a block diagram of a circuit for calculating signal energy.

Two assumptions in the algorithm for calculating energy are that speech has more energy than noise and that speech energy rises more rapidly from frame to frame. These have been found to be reasonable assumptions, as long as the noise is not very loud. The algorithm, illustrated in FIG. 14, is not dependent on frame size. Each sample is squared (165) and all the squared samples are summed (166). The sum is called frame energy. The current frame energy (166) and the last two frame energies (167, 168) are added (169) to give a scaled average over the last three frames. Dividing by three to find an actual average is omitted because three is just a scale factor and is absorbed in later calculations. Omitting a division step also saves computer time.

Figure 15:
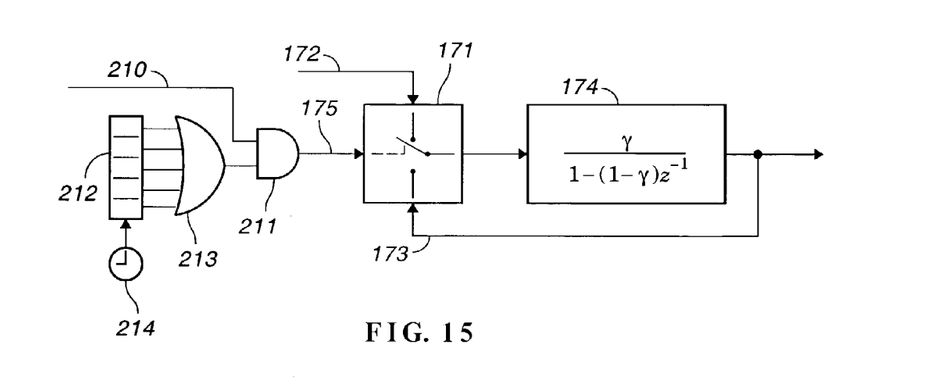
FIG. 15 is a block diagram of a circuit for calculating a dynamic threshold.

The noiseTh signal is produced by threshold calculation block 162, illustrated in greater detail in FIG. 15. In order to average the background noise energy levels over many frames without using memory, an averaging filter is used. Select block 171 couples either the input signal, on line 172, or the last average, on line 173, to average calculation block 174 under the control of a signal on control line 175. If the last average is applied as the input, the average is unaffected. In one embodiment of the invention, the filter is implemented by the following equation.

$$y[n]=\gamma \cdot x[n]+(1-\gamma)\cdot y[n-1]$$

The parameter $\gamma$ is used to determine the length of the average. This value was set to 0.02 in one embodiment of the invention. The speech signal (FIG. 13) determines which signal is included in the average. If the current frame has speech, the frame energy will not be included in the next calculation. Instead, the last average value is fed to the filter, which has no effect on the average. Thus the average does not change when speech is detected. This prevents speech energy from corrupting the background energy calculation. The average background energy can be used directly or scaled prior to use.

In block 163 (FIG. 13), the current average background energy is used as a threshold for comparison with the current frame energy from block 161. If the current frame energy is greater the threshold, speech is set to logic "1".

Figure 16:
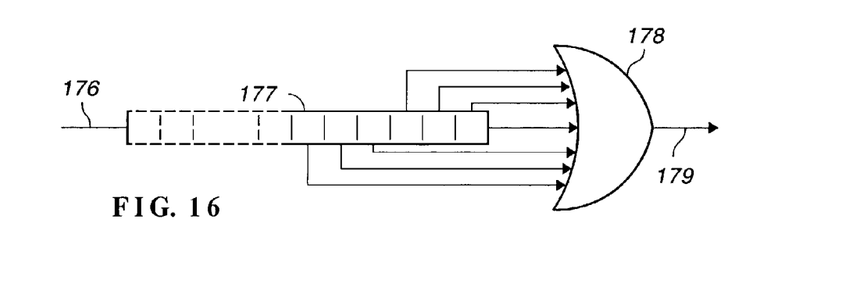
FIG. 16 is a block diagram of a fast attack, slow release circuit.

Block 164 (FIG. 13) is called a hold-off circuit because it is not a delay line. Rather, Block 164 is a fast attack, slow release circuit for modifying the speech control signal. As illustrated in FIG. 16, a binary (0 or 1) input signal on line 176 is coupled to a shift register 177 having a serial input and parallel outputs. The outputs are coupled to OR-gate 178.

In one embodiment of the invention, a sixteen bit shift register is used, although only the outputs of the lower five bits are OR-ed. The number of bits is arbitrary. Monitoring five bits means that there must be five consecutive frames of zero before the output goes zero. This means that there must be five consecutive frames of low (background) signal energy before the circuit shown in FIG. 15 will modify the average background noise energy calculation. Because the parallel outputs are coupled to OR-gate 178, a logic "1" input is immediately coupled to output 179. Thus, the hold-off circuit exhibits a fast attack, slow release. The effect is to smooth the operation of circuit 140 (FIG. 11).

Energy measurements requires both resolution and range for squaring and summing of thirty-two values. These are conflicting requirements in a fixed-point implementation. The solution is to implement the energy calculation using the MAC (Multiply/ACcumulate) function available in some DSPs (Digital Signal Processors). Because the accumulator is 40-bits wide, the MAC function is performed and the result is rounded to 32-bits for use in the system. For other processors with a narrower accumulator, the calculation may not be as efficient. As presently implemented with currently available microprocessors, it is necessary to use 32-bit precision. One embodiment took advantage of the registers and accumulators in the target DSP (TMS320C54x family) for efficiency. There are two 32-bit sums and a few 32-bit stores.

"Efficiency" in a programming sense is the number of instructions required to perform a function. Fewer instructions is better or more efficient than many instructions on a given microprocessor, wherein an instruction is the binary code for controlling a microprocessor. In languages other than machine (assembly) language, a line of code may involve hundreds of instructions. As used herein, "efficiency" relates to machine language instructions, not lines of code.

Figure 17:
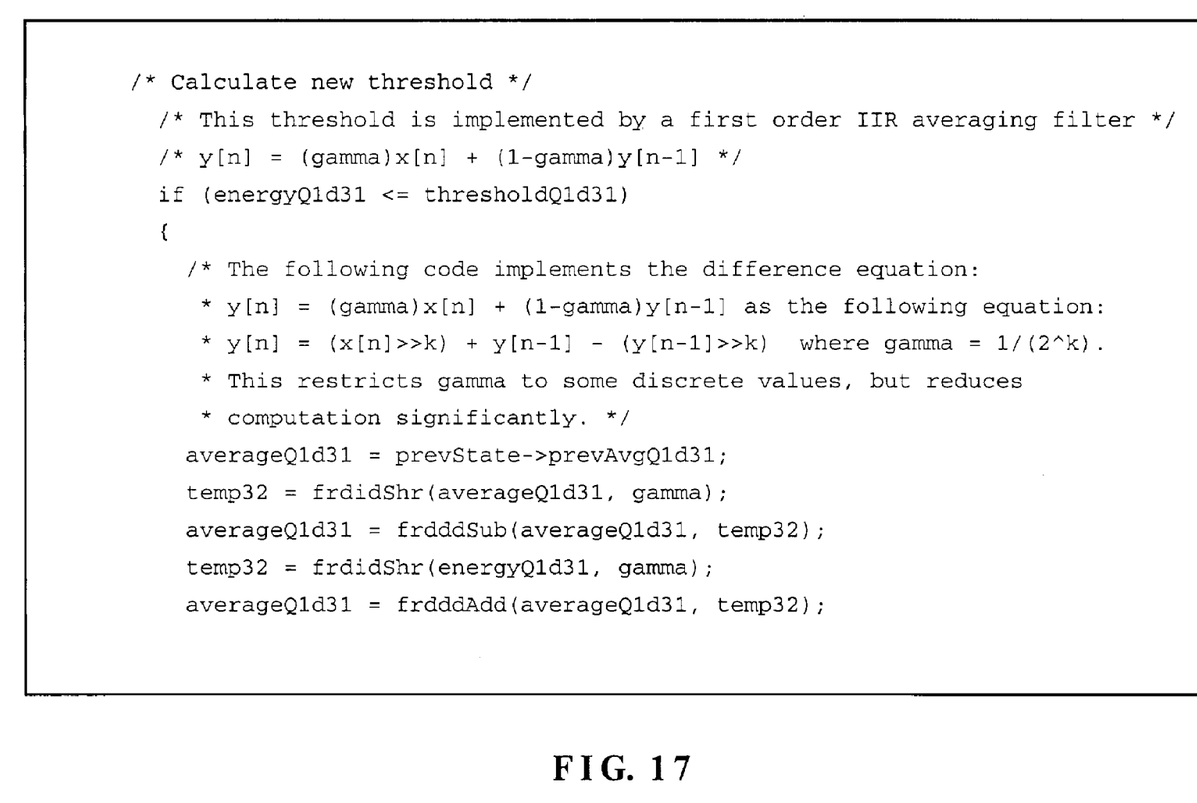
FIG. 17 is source code for a routine that averages signal energy.

Background noise measurement uses an averaging filter. It was found that 16-bits is not enough resolution for this function. Over time, rounding errors accumulated in the filter resulting in an inaccurate measurement. Thus, a 32-bit filter was needed. This could have been very inefficient because the filter involves two multiplies and two additions. By restricting gamma to values equal to reciprocal powers of two, the multiplies can be replaced by right shifts, which are much more efficient than 32-bit multiplies. The code listed in FIG. 17 illustrates this point. A gamma of 0.02 ($\approx 2^{-6}$) was used in one embodiment of the invention.

As described thus far, a control system constructed in accordance with the invention includes n VAD circuits, one for each sub-band in the transmit and receive channels. In accordance with the invention, there is an additional VAD circuit, a wide band or system VAD that includes double talk detection, illustrated in FIG. 18.

A fundamental problem in echo canceling is distinguishing between near end speech and far end echo. With many echo-canceling algorithms, it is essential to know when double talk is occurring. An echo of far end speech can easily be mistaken for near end speech. The purpose of a double talk detector is to tell the difference between the two.

Part of the double talk detection algorithm used herein calculates a ratio using signals from three locations, IN, OUT, and ECHO. Referring to FIG. 10, the IN signal is at the left hand side of circuit 122, the OUT signal at the right hand side of circuit 122, and the ECHO signal is the output from block 123. Referring again to FIG. 18, VAD 180 depends on an operating echo canceling circuit. The echo canceling circuit must provide an estimate of the echo before the system VAD will work. In a control system constructed in accordance with the invention, the echo canceling circuit is also dependent on the VAD for correctly detecting an echo. The closed loop that is created between the two elements is resolved with a short delay element, which is not ideal but works well and is stable.

Figure 18:
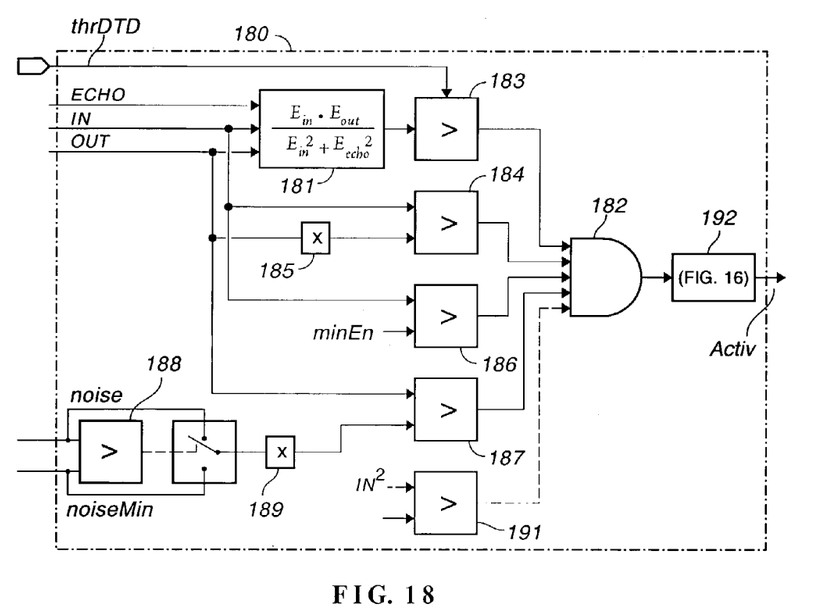
FIG. 18 is a block diagram of a system or wide band VAD circuit.

After the ratio is calculated, it is compared to a threshold called thrDTD in comparator 183. This threshold is nominally set to 0.1. The number is not critical because the ratio typically produces values that are equal to one (1) or very nearly one, or zero (0) or very nearly zero. If double talk is present, the ratio will yield an answer very close to one. This can be seen by inspecting the ratio in block 181. If there is no echo to cancel, the echo estimate will be close to zero and IN and OUT will be nearly identical, yielding a ratio close to one. A ratio near zero means that there is an echo present. Thus, a threshold nominally between zero and one is sufficient.

In order for the double talk detector to work correctly, the echo canceling circuit must be functioning. If the echo canceling circuit is disabled or is not canceling echoes, then it is as if the double talk detector is not in the circuit. A result that the system may spend more time in a double talk state than is appropriate. To minimize this possibility, there are four additional comparisons made in the wide band VAD. All five comparisons generate binary signals that are combined in AND circuit 182 to determine the final value of the output signal, Actiu.

The next comparison determines whether or not the echo canceling circuit is operating. This is done by comparing input and output energies in comparator 184. The output energy is preferably reduced by a small amount in multiplier 185. If the product is greater than the input energy, then the echo canceling circuit is not operating. This makes sense because the echo canceling circuit normally subtracts signals to cancel echo. A logic "1" output indicates operation. A factor of 0.9 has been found suitable for multiplier 185.

The next comparison is simply a check to assure that the input energy is not numerically too small. It is difficult to calculate an accurate ratio if the input energy is very small (less than seven bits or 0.01). The input energy is compared to a threshold in comparator 186 to generate a binary signal. A logic "1" output indicates sufficient energy.

Figure 19:
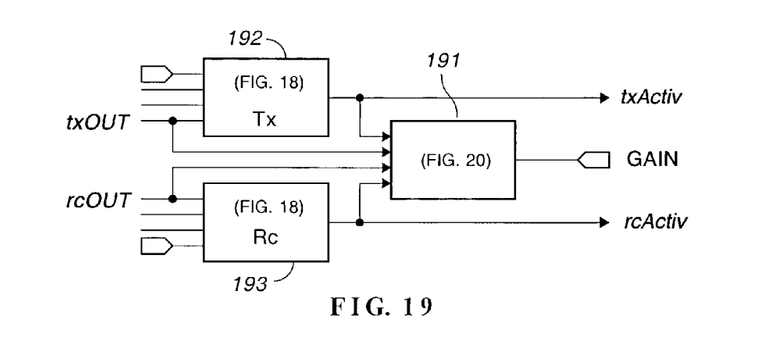
FIG. 19 is a block diagram of a circuit for generating further control signals.

In comparator 187, the OUT signal is compared to a signal representing noise. A background noise signal is measured for each channel. (Block 180 is duplicated for each channel, as illustrated in FIG. 19.) The noise signal is compared to a minimum noise level in comparator 188. The noiseMin signal is data from a register. The output signal from comparator 188 is used as a control signal to select the greater of noise or noiseMin for further processing. The greater of the two is multiplied by a scaling factor in multiplier 189 and the product is compared with the OUT signal in comparator 187 to create a binary value. If there is speech, then the speech signal will be greater than the background noise. For the reasons discussed above, a scaling factor of three was used in one embodiment of the invention.

Optional comparator 191 is another double talk detector that uses a method similar to the Geigel double talk detector method. In the Geigel method, a certain loss between the speaker and the microphone on the near end is assumed. The assumed loss varies from phone to phone, depending on design, location and other factors, but a 4 dB loss is a representative example. The energy of the microphone signal is then compared to the energy of the speaker signal. If the microphone signal energy is greater than or equal to the speaker signal energy, then near end speech is present and the output is a logic "1". Programmable gains on the speaker output and microphone input should take into account the assumed loss. In this example, the programmable gain amplifiers are adjusted to make the microphone signal 4 dB below the speaker signal when no near end speech is present.

The outputs from the comparators are coupled to AND gate 182. Only when all inputs are a logic "1" will the output from AND gate 182 be a logic "1". This signal is coupled to hold-off circuit 192. The operation of circuit 192 is described in connection with FIG. 16. The output from circuit 192 is a binary (one-bit) signal labeled "Activ". As shown in FIG. 19, there is an Activ signal for each channel.

A purpose of control block 140 (FIG. 11) is to consolidate all the information from twenty sub-band VAD blocks. This information includes the energy of the background noise in both the receive channel and the transmit channel, the current frame energy in each of the twenty sub-bands, and whether there is speech present on the receive, transmit, or both channels. This information is used to determine which sub-bands will be open during double talk, whether the system is in double talk, transmit, or receive states, whether there is howling present, and several other things.

Combining circuits 148 through 149 are not identical and their structure and operation depends upon the nature of the outputs from detectors 146 through 147. For single bit data, the combining circuit is a register in which the bits are set ("1") or reset ("0"), wherein each bit represents a sub-band. For example, the one-bit talk signals are combined into a ten-bit wide vector (one bit for each sub-band in a channel). The vector is used to control the gain in each of the ten sub-bands individually. For example, if bit zero of talk is "1", the speaker out signal is attenuated in the lowest frequency band and the line out signal is amplified in the lowest frequency band. The opposite is true if bit zero were "0". In other words, the talk signal is named from the perspective of the near end talker.

Similarly, the txSpeech signal and the rcSpeech signal are ten-bit values representing the sub-bands. The txSpeech and rcSpeech signals are used by the sub-band noise reduction block to control noise reduction (attenuation) in each sub-band. Consolidating data is, therefore, bit manipulation of a single word of data.

A register can be a separate circuit, such as a shift register, or a memory location internal or external to a microprocessor, or an I/O (input/output) port internal or external to a microprocessor. Generally, a register is sixteen bits or a single word. More or fewer bits can be used, depending upon system requirements.

The txEnergy and rcEnergy signals occupy ten memory locations, for example, ten 16-bit words. The number of words or vectors is the same as the number of sub-bands in a channel. Each word is the energy measurement of the current frame for one sub-band in one channel.

The lineNoiseTh signal is a 16-bit word representing the sum of the noise levels in each sub-band in the receive channel. The micNoiseTh signal is a 16-bit word representing the sum of the noise levels in each sub-band in the transmit channel.

Although this description may indicate a one-to-one correspondence between the number of sub-bands and the number of bits or words, this does not mean that circuitry within the controlled system must use all the data. For example, for speech detection, one may choose to ignore the higher frequency sub-bands because most of the energy in speech is in the lower six sub-bands. The amount of data to process is reduced and the system operates more quickly.

The txActiv and rxActiv signals are used to determine if the system should be in single talk, double talk, or silence modes. These are very important signals in the sub-system. The double talk detector block uses the background noise measurements and the energy measurements from around the echo canceling circuits to calculate rxActiv and txActiv. As shown in FIG. 18, several intermediate signals are calculated in double talk detector block 180 and then are ANDed together to determine the value of the rxActiv and txActiv signals (FIG. 19).

LinNoiseLevel and micNoiseLevel are measures of the background noise levels on their respective signal channels. To consolidate these signals, the sum of the ten separate signals from the sub-band VAD blocks is calculated. This produces a scaled average of the inputs; i.e. the sum is used directly, not divided by ten to calculate an average. Subsequent calculations take this fact into account.

In addition to controlling machine state and allocation of sub-bands, the data from detector 180 is used to control gain between channels in what is called dynamic balance control, illustrated in FIG. 19. Dynamic balance control is used to balance the energies between the transmit channel and the receive channel before the energies are compared to determine the value of talk (see FIG. 12). The dynamic balance control allows the sub-bands to be more evenly divided between signals that have different energies. In a preferred embodiment of the invention, energy is calculated. Peak amplitude could be used instead to hasten calculation at the expense of accuracy.

In FIG. 19, the GAIN signal is calculated in block 191 from data provided by detectors 192 and 193. The operation of these detectors is described in connection with FIG. 18. For block 192, the tXOUT signal is the signal from the output of summation circuit 133 (FIG. 10). For block 193, the rcOUT signal is the signal from the output of summation circuit 122 (FIG. 10). These two signals, plus the txActiv signal and the rcActiv signal are combined in block 191, shown in greater detail in FIG. 20.

Figure 20:
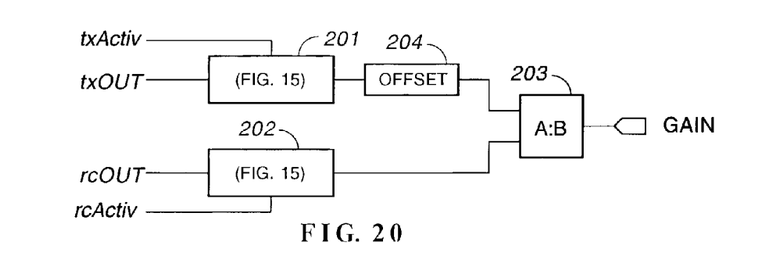
FIG. 20 is a more detailed block diagram of a block shown in FIG. 19.

Referring to FIGS. 15 and 20, the txActiv signal is a binary signal applied to the control input of gate 171 in averaging circuit 201. The energy values on txOUT are coupled to input 172. Similarly, the rcActiv signal is a binary signal applied to the control input of gate 171 in averaging circuit 202. The energy values on txOUT are coupled to input 172. The outputs of averaging circuits 201 and 202 are divided in ratio circuit 203, with the signal from averaging circuit 202 being the denominator. The quotient from circuit 203 is the GAIN signal, which controls the gain of amplifier 153 (FIG. 12).

In a preferred embodiment of the invention, circuits 201 and 202 provide a long term average; i.e. $\gamma=2^{-8}(\approx 0.004)$. In other words, it takes two hundred fifty-six frames, approximately one second, to adjust completely to a step change in energy. Increasing the magnitude of γ decreases the length of the average. Also in a preferred embodiment of the invention, the ratio is limited to a value from 16:1 to 1:16 (16.00 to 0.06). It is preferred to multiply the average from circuit 201 by an offset to bias the GAIN signal in favor of the MIC IN signal. In one embodiment of the invention, the offset in block 204 is 0.9. This means that, at balance, the LINE IN signal is approximately 0.9 times the MIC IN signal.

It is possible, although infrequent, that the averaging circuit illustrated in FIG. 15 remain in the closed loop condition during intervals of loud background noise. That is, select block 171 may couple the last average back to the input for long intervals as though there were speech when there really is no speech. To prevent this, AND circuit 211 is interposed between the output of hold-off circuit 164 (FIG. 13) and control line 175. Input 210 of AND circuit 211 is coupled to circuit 164. A second input to AND circuit 211 is coupled to the outputs of register 212 by OR gate 213. Register 212 counts pulses from clock 214. If any stage of register 212 is a logic "1", then AND gate 211 is enabled and the output follows the data on line 210. When register 212 is reset or cycles through zero, AND gate 211 is disabled, producing a logic "0". A logic "0" forces the averaging circuit to adapt, i.e. to read input line 172. During typical operation, this forced adaptation does not occur because the signal on line 210 drops to zero before register 212 cycles through zero. Logic (not shown) resets register 212 when the signal on line 210 is a logic zero. Clock 214 is the system clock or another source of pulses. Cycling register 212 through a full count preferably takes about one second, although other periods can be used instead.

The invention thus provides an improved method and apparatus for controlling echo cancellation and noise reduction in a telephone by providing voice detection on each sub-band in both transmit and receive channels. Half duplex operation is minimized during a call by more reliable detection of double talk and improved allocation of sub-bands, enabling double talk to continue with time varying input levels. Stated another way, full duplex communication is possible, in a system constructed in accordance with the invention, until the receive signal or the transmit signal is very much louder than the other signal. Dynamically adjustable thresholds improve double talk detection and the voice activity detector does not require large amounts of data (only three frames, or about 12 milliseconds) for reliable detection of a voice signal.

Having thus described the invention, it will be apparent to those of skill in the art that various modifications can be made within the scope of the invention. For example, signals that are represented by one bit could be represented by more than one bit to provide finer control; e.g. the sub-band talk signals can be double bit (four value) rather than single bit (two value). The control signal for the averaging circuit illustrated in FIG. 15 could be taken from the output of block 163 (FIG. 13) instead of the output of block 164.

What is claimed as the invention is:

1. In a telephone including an audio frequency circuit having a transmit channel and a receive channel, an acoustic echo canceling circuit, a line echo canceling circuit, and a noise reduction circuit coupled to the channels, and wherein each channel includes a filter bank for dividing the channel into a plurality of sub-bands, the improvement comprising:
a plurality of voice activity detectors coupled led one to each sub-band filter, wherein each voice activity detector produces a signal indicative of the energy content of an input signal to the detector;
a plurality of variable gain amplifiers coupled one each to a voice activity detector in the receive channel;
a plurality of comparators coupled one each to a pair of voice activity detectors, wherein each pair includes a voice activity detector from the transmit channel and the variable gain amplifier from the corresponding voice activity detector coupled to the receive channel;
means for controlling the gain of said variable gain amplifiers to provide a predetermined balance between the channels, said means including:
a first averaging circuit coupled to the output of the acoustic echo canceller;
a second averaging circuit coupled to the output of the line echo canceller; and
a ratio detector coupled to the first averaging circuit and the second averaging circuit;
wherein said means controls gain in accordance with the ratio of the averages of the outputs of the acoustic echo canceling circuit and the line echo canceling circuit.

2. The telephone as set forth in claim 1 wherein each averaging circuit averages an input signal only when the input signal exceeds a predetermined threshold.

3. The telephone as set forth in claim 2 wherein the predetermined thresholds are determined separately for each averaging circuit.

4. The telephone as set forth in claim 1 wherein each averaging circuit averages amplitude.

5. The telephone as set forth in claim 1 wherein each averaging circuit averages energy.

6. In a telephone including an audio frequency circuit having a transmit channel having variable gain and a receive channel having variable gain, an acoustic echo canceling circuit, and a line echo canceling circuit, the improvement comprising:
a first averaging circuit coupled to the output of the acoustic echo canceller;
a second averaging circuit coupled to the output of the line echo canceller; and
a ratio detector coupled to the first averaging circuit and the second averaging circuit;
wherein the output of the ratio detector controls gain in each channel.

7. The telephone as set forth in claim 6 wherein each averaging circuit averages an input signal only when the input signal exceeds a predetermined threshold.

8. The telephone as set forth in claim 7 wherein the predetermined thresholds are determined separately for each averaging circuit.

9. The telephone as set forth in claim 8 and further including:
a first broad band voice activity detector coupled to said acoustic echo canceller and to said first averaging circuit for controlling the averaging of the output signal from the acoustic echo canceller;
a second broad band voice activity detector coupled to said line echo canceller and to said second averaging circuit for controlling the averaging of the output signal from the line echo canceller.

10. The telephone as set forth in claim 9 wherein each broad band voice activity detector includes:
a plurality of threshold detectors;
an AND circuit having a plurality of inputs coupled one to each of said threshold detectors;
a ratio detector coupled to an echo canceling circuit for calculating the following ratio $$\frac{E_{in} \cdot E_{out}}{E_{in}^2 + E_{echo}^2};$$

where $E_{in}$ is the signal at the input to the echo canceling circuit, $E_{out}$ is the signal output from the echo canceling circuit, and $E_{echo}$ is the echo estimate generated by the echo canceling circuit; and wherein a first of said threshold detectors is coupled to the output of said ratio detector.

11. The telephone asset forth in claim 10 wherein a second of said threshold detectors is coupled to $E_{in}$, a third of said threshold detectors is coupled to both $E_{in}$ and $E_{out}$.

12. The telephone as set forth in claim 11 wherein a fourth of said threshold detectors is coupled to $E_{out}$ and compares $E_{out}$ with a noise threshold.

13. The telephone as set forth in claim 12 wherein said telephone is a cellular telephone and further includes radio frequency circuitry coupled to said audio frequency circuitry.

* * * * *